US006634021B2

(12) United States Patent
Santhanam (10) Patent No.: US 6,634,021 B2
(45) Date of Patent: *Oct. 14, 2003

(54) USER CONTROLLED RELAXATION OF OPTIMIZATION CONSTRAINTS RELATED TO VOLATILE MEMORY REFERENCES (75) Inventor: Vatsa Santhanam, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/836,667

(22) Filed: Apr. 16, 2001

(65) Prior Publication Data
US 2001/0014967 A1 Aug. 16, 2001

Related U.S. Application Data (63) Continuation of application No. 08/833,558, filed on Apr. 7, 1997.

(51) Int. Cl.⁷ .................................................. G06F 9/45
(52) U.S. Cl. ......................................... 717/151; 717/153
(58) Field of Search ................................. 717/151, 153, 717/152, 114

(56) References Cited

U.S. PATENT DOCUMENTS

| 5,335,351 | A | | 8/1994 | Aida et al. ................... 717/154 |
|---|---|---|---|---|
| 5,535,391 | A | | 7/1996 | Hejlsberg et al. ............ 717/140 |
| 5,586,020 | A | | 12/1996 | Isozaki ........................ 717/159 |
| 5,606,697 | A | | 2/1997 | Ono ............................ 717/159 |
| 5,742,828 | A | | 4/1998 | Canady et al. ............... 717/154 |
| 5,758,164 | A | | 5/1998 | Inoue .......................... 717/158 |
| 5,850,553 | A | * | 12/1998 | Schlansker et al. ......... 717/151 |
| 6,090,155 | A | * | 7/2000 | Donovan et al. ............ 717/151 |
| 6,260,191 | B1 | * | 7/2001 | Santhanam .................. 717/151 |
| 6,351,845 | B1 | * | 2/2002 | Hinker et al. ................ 717/127 |

OTHER PUBLICATIONS

Microsoft Visual CTT Development System for Windows, Programmer's Guides, Programming Techniques pp. 1–16, Version 1.0, 1993.*
Schatzman, B.; "Unraveling Optimization in Microsoft C 6.0"; Dr. Dobs Journal, Oct. 1990.
Borland International, Inc., User's Guide: Borland C + + Version 4.0, Chapter 3—Comiling 43–82, 1993.
Borland International, Inc., Programmer's Guide: Borland C + + Version 4.0, pp. 2, 37, 48–58, 198–202, 1993.
Kane, Gerry, "PA–RISC 2.0 Architecture", Hewlett–Packard Company, pp. 7–84, 7–85, 7–142, 7–143 and G–1 throught G–14.
International Standard Programming Language C + + 180.IEC 14882 First Edition, Jan. 1998.
Accredited Standards Committee X3, Information Processing Systems, Feb. 14, 1990 by David F. Prosser.

* cited by examiner

Primary Examiner—Todd Ingberg (57) ABSTRACT

A regime of keywords modifying a volatile type-qualifier for use in source code accessing volatile objects via, for example, pointers to volatile memory locations. Each keyword permits corresponding selected optimizations by a compiler even though the volatile type-qualifier is also declared. Users select and combine keywords so as to relax corresponding optimization constraints otherwise ordained by use of the volatile type-qualifier.

13 Claims, 3 Drawing Sheets

```
int Y;
volatile int *P;    ← DECLARATION
FOO ( )
{
    *P=10;
    Y=*P;
}
```

*FIG. 1*

CONSERVATIVE CODE SEQUENCE
FOR Y=*P STATEMENT $I_1$    $R_1$=LOAD <ADDRESS OF P>
$I_2$    $R_2$=10
$I_3$    STORE.O <$R_1$>, $R_2$
$I_4$    $R_3$=LOAD.O <$R_1$>
$I_5$    STORE <ADDRESS OF Y>, $R_3$
              ORDERED LOAD
              ORDERED STORE

*FIG. 2*

AGGRESSIVE CODE SEQUENCE
FOR Y=*P STATEMENT
(P DECLARED int *P)

$I_1$ : $R_1$=LOAD <ADDRESS OF P>
$I_2$ : $R_2$=10
$I_3$ : STORE <$R_1$>, $R_2$
$I_5$ : STORE <ADDRESS OF Y>, $R_2$

*FIG. 3*

```
int Y;
_SYNCHRONOUS volatile int *P;
FOO ( )
{
    *P=10;
    Y=*P;
}
```

*FIG. 4a*

$I_1$ : $R_1$=LOAD <ADDRESS OF P>
$I_2$ : $R_2$=10
$I_3$ : STORE.O <$R_1$>, $R_2$
$I_5$ : STORE <ADDRESS OF Y>, $R_2$

*FIG. 4b*

```
int Y;
_UNORDERED volatile int *P;
FOO ( )
{
    *P=10;
    Y=*P;
}
```

*FIG. 5*

$I_1$ : $R_1$=LOAD <ADDRESS OF P>
$I_2$ : $R_2$=10
$I_3$ : STORE <$R_1$>, $R_2$
$I_4$ : $R_3$=LOAD <$R_1$>
$I_5$ : STORE <ADDRESS OF Y>, $R_3$

*FIG. 6*

```
_NON_SEQUENTIAL _UNORDERED volatile int *P;
short X, Y, Z;
FOO ( )
{
    X=10;
    *P=30;
    Y=20;
    Z=*P;
}
```

*FIG. 7*

$I_1$ : $R_1=10$
$I_2$ : STORE <ADDRESS X>, $R_1$
$I_3$ : $R_2=30$
$I_4$ : $R_3$=LOAD <ADDRESS P>
$I_5$ : STORE.O <$R_3$>, $R_2$
$I_6$ : $R_4=20$
$I_7$ : STORE <ADDRESS Y>, $R_4$
$I_8$ : $R_5$=LOAD.O <$R_3$>
$I_9$ : STORE <ADDRESS OF Z>, $R_5$

FIG. 8

$I_1$ : $R_1=10$
$I_2$ : STORE <ADDRESS X>, $R_1$
$I_3$ : $R_2=30$
$I_4$ : $R_3$=LOAD <ADDRESS P>
$I_5$ : STORE <$R_3$>, $R_2$
$I_6$ : $R_4=20$
$I_7$ : STORE <ADDRESS Y>, $R_4$
$I_8$ : $R_5$=LOAD <$R_3$>
$I_9$ : STORE <ADDRESS OF Z>, $R_5$

FIG. 9

$$\begin{bmatrix} I_3 \\ I_4 \\ I_5 \\ I_1 \\ I_2 \\ I_6 \\ I_7 \\ I_8 \\ I_9 \end{bmatrix}$$

FIG. 10

```
int X;
volatile int *P;
int G;
FOO ( )
{,
    *P=5 ;
    if (G==1)
    {,
        X=*P;
    }
}
```

FIG. 11

$I_1$ : LOAD $R_1$, <ADDRESS OF G>
$I_2$ : CMPB, <> $R_1$, 1, $I_6$
$I_3$ : ——LOAD $R_2$, <ADDRESS OF P>
$I_4$ : ——LOAD.O $R_3$, <$R_2$>
$I_5$ : ——STORE <ADDRESS X>, $R_3$
$I_6$ : —. . . .

FIG. 12

```
_SIDE_EFFECT_FREE volatile int *P;
int X;
int G;
FOO ( )
{,
    if (G==1)
    {,
        X=*P;
    }
}
```

$I_1$ : LOAD $R_1$, <ADDRESS OF G>
$I_3$ : —— LOAD $R_2$, <ADDRESS OF P>
$I_4$ : —— LOAD.O $R_3$, <$R_2$>
$I_2$ : CMPB, <> $R_1$, 1, $I_6$
$I_5$ : —— STORE <ADDRESS X>, $R_3$
$I_6$ : —— . . . .

FIG. 15

FIG. 16 typedef _SIDE_EFFECT_FREE volatile int NON_IO_TYPE;
NON_IO_TYPE *P;

FIG. 17

USER CONTROLLED RELAXATION OF OPTIMIZATION CONSTRAINTS RELATED TO VOLATILE MEMORY REFERENCES

CROSS REFERENCE TO RELATED APPLICATIONS(S)

This is a continuation of copending application Ser. No. 08/833,558 filed on Apr. 7, 1997.

BACKGROUND OF THE INVENTION

The C and C++ language standards are among those that support the "volatile" type-qualifier for compiler operation. For example, as stated in the 1990 American National Standard for Information Systems Programming Language C (hereinafter referred to as the "ANSI Standard"): "An object that has volatile-qualified type may be modified in ways unknown to the implementation or have other unknown side effects."

A programmer may use the volatile type-qualifier for a variety of reasons, such as to enable accesses to shared memory, or to memory-mapped I/O locations (so as, for example, to communicate with external devices). Alternatively, the volatile type-qualifier may be used to enable access to locations that may be asynchronously accessed by an interrupt handler.

Accordingly, compilers, and more specifically compiler optimization phases, tend to be very conservative in the treatment of accesses to objects with volatile-qualified type in order to adhere to the standard and to accommodate the spectrum of applications of the volatile keyword. This conservative approach often results in a loss of compiler optimization opportunities and hence adversely affects run-time performance.

Compilers generally treat an access to a volatile type-qualified object in a universally inflexible manner. Specifically, for example, a volatile load or store is never deleted or transformed into a register reference;

a volatile load or store is emitted with an "ordered" completer to ensure sequential run-time hardware execution on weakly ordered systems;

no memory reference instructions are scheduled across a volatile load or store; and a volatile load or store is never moved to a location where it could be executed "speculatively."

It is not always necessary to take such a universally inflexible approach. Sometimes selected optimizations could be allowed without endangering compilation integrity. These selected optimizations could help recover otherwise lost optimization opportunities and thereby enhance run-time performance.

Operating systems, in particular, have a need to declare a wide variety of data accesses as volatile in order to prevent incorrect compiler optimization of kernel code. However, this adversely affects performance, sometimes more than necessary. For instance, on weakly ordered systems, the volatile type-qualifier may be specified solely to ensure that the compiler emits a memory reference instruction to the volatile type-qualified object using a "strongly ordered" memory reference opcode or completer. In some programming applications, however, it may be perfectly acceptable for the compiler to perform certain selected optimizations, such as local register promotion on accesses using a "strongly ordered" completer, even though such transformations might not be safe to perform on all volatile references in general.

There is therefore a need for a regime of keywords that modify the general volatile type-qualifier, and whose selected use will permit (or not permit) certain optimization operations in compiling code containing references to volatile data.

SUMMARY OF THE INVENTION

These and other objects and features are achieved by one embodiment of the invention which comprises a system that enables a programmer to relax optimization constraints and requirements that are otherwise associated with volatile memory reference by default. Specifically, these relaxation "hints" can be expressed either as additional modifying type-qualifiers or as pragmas to loosen the restrictions associated with the volatile type-qualifier. By way of example (and without limitation), four (4) such relaxation hints are illustrated below that bring technical advantage to a corresponding volatile access described therewith:

a. relaxing asynchronicity of the access: a volatile access that is guaranteed to be synchronous allows local register promotion and eliminates redundant definition of volatile loads and stores.

b. relaxing strong ordering requirements: if the underlying hardware does not need to observe strong ordering constraints when executing a volatile memory access, the corresponding load or store need not be marked with the ordered completer, which in turn allows faster execution of such references at run-time.

c. relaxing constraints on compiler scheduling freedom: a volatile access that does not need to be executed sequentially relative to other non-volatile references can be scheduled better by the compiler.

d. relaxing constraints on control speculation freedom: a volatile access that does not refer to a memory-mapped I/O location can be re-ordered to execute speculatively ahead of controlling branches, again leading to potentially higher run-time performance.

Accordingly, one technical advantage of the invention is that a programmer is allowed to facilitate increased optimization of accesses to volatile type-qualified objects in contexts where it is safe and advantageous to do so.

Another technical advantage of the invention is that the system allows a programmer to selectively increase the aggressiveness of the compiler for certain code which would otherwise be compiled in a conservative (non-aggressive) manner.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Although an embodiment of the invention is described below with reference to the C programming language, it will be appreciated that the present invention applies to C++ and other high-level languages supporting data-type extensions to declare objects as volatile.

Use of the volatile keyword as a type-qualifier is governed by the ANSI Standard, which requires that a compiler be very conservative in translation of an object qualified by a volatile keyword. The ANSI Standard states that a volatile keyword may, for example, make reference to an object whose memory address is a predetermined memory mapped I/O location having a device associated therewith. Thus, storing a value to that location, or loading a value from that location may be predetermined to trigger some external event. For example, a video graphics card mapped to a preselected memory location may be disposed to display all green on the screen if "555" is written to that location. Alternatively, the card may be disposed to turn the display off if a different value is read from that location. Thus, the stored value has side effects beyond what a compiler would normally be aware of in processing code. Accordingly, a volatile type-qualifier is used to qualify such a reference, signaling to the compiler to be very conservative in its treatment of the reference so as not to affect the external event. Certainly, in the current art, no optimization would normally be allowed in association with such references declared to be volatile.

Figure 1:
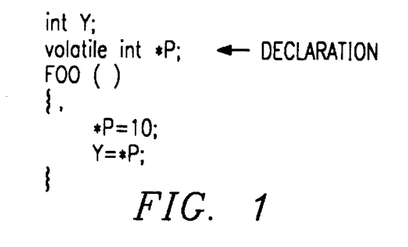
FIG. 1 is a segment of C source code illustrating use in the current art of the volatile type-qualifier.

FIG. 1 is an example of the use of the volatile keyword as a type-qualifier in the current art. FIG. 1 shows several lines of source code in a simple routine in which line 1 simply specifies that a scalar variable Y shall have integer values. Then, in line 2, a declaration is made using the volatile keyword. In FIG. 1, the volatile keyword is qualifying the type of objects that the declared pointer variable P can point to. The compiler will thus understand that P is a pointer variable, meaning values may be assigned to it that correspond to memory addresses. Furthermore, as declared in FIG. 1, the objects that P may point to are of type int, meaning that they are of integer value, such as 1, 2, 3, and so on, positive or negative. The volatile keyword further qualifies the objects that P can point to by allowing integer values to be read or written to memory locations pointed to by P wherever P is de-referenced, but that location is always to be treated as a volatile memory location, meaning loads and stores therefrom could have side effects.

With further reference to FIG. 1, line 3 enables a routine named FOO, where the parentheses indicate that FOO is without parameters and where the braces define the statements to be associated with that function. With momentary reference back to line 2 above on FIG. 1, it will be further seen that P is defined as a global variable because the volatile declaration of P appears outside the scope of the function FOO. Going into FOO, therefore, P presumably has some value that was assigned to it by some other function operating on P before FOO. So P now has some legal value, presumably pointing to a memory address that is a volatile location as described above.

Moving to line 5 on FIG. 1, P is de-referenced, meaning the compiler will interpret line 5 to store a value through P (because P appears on the left-hand side of the equal sign in line 5). Specifically, line 5 tells the compiler to store the value 10 to the memory location whose address is represented by the current value of P. Now it may be that the value 10 has special significance to a device that is associated with that address.

Line 6 on FIG. 1 describes a read operation, i.e. the value currently stored in the memory location represented by the current value of P is being assigned to another global variable Y. Y, unlike P, is a scalar variable, which, as noted above in reference to line 1 on FIG. 1, is of type int as well. So line 6 loads up a memory value from the volatile memory location represented by the current value of P and assigns it to the global variable Y.

A significant aspect of the code shown on FIG. 1 is that contrary to intuition, Y is not necessarily equal to 10 when line 6 is finished with execution. Of course, this would be expected always to be the case if P were a pointer to an ordinary memory location. The fact is, however, that P has been declared in line 2 to be volatile, suggesting that it may point to a memory address that is a volatile memory location. Furthermore, as described above, the act of storing the value 10 in address pointed to by P may not in fact cause an integer value of 10 to be stored in that physical memory location. Instead, the act of storing may cause a device driver mapped to that location to go and do something, such as enable an initialization sequence and then return a 1 or a 0 when complete, where 1 says "yes, I was able to honor your request to power up," and 0 says "no I wasn't able to." Thus, in FIG. 1 where P is pointing to a volatile memory location, it is indeterminate what value Y actually gets, even though by analyzing this code it may seem obvious that Y should have the value 10.

This is an example where, for good reason, the volatile type declaration in line 2 on FIG. 1 is preventing a compiler optimization. If P was a pointer to an ordinary integer then an exemplary legal optimization might be to replace the operations in lines 5 and 6 with a much simpler assignment (i.e. Y=10). But since P has been declared volatile in line 2, the compiler has to be very conservative and thus may not perform this optimization.

Figure 2:
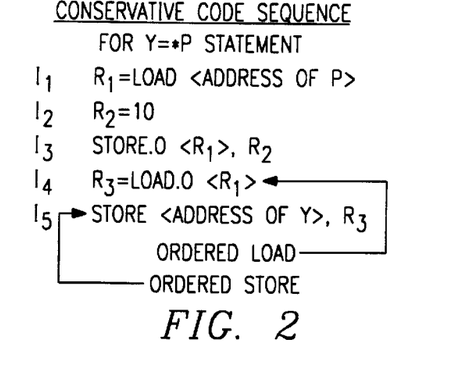
FIG. 2 is a sequence of instructions illustrating conservative compilation of the function FOO shown in FIG. 1.

FIG. 2 illustrates the conservative machine instruction sequence for the function FOO depicted in FIG. 1 (i.e. lines 5 and 6 thereof), and particularly highlighting the effects of not optimizing lines 5 and 6 on FIG. 1 where *P=10 and Y=*P. FIG. 2 thus assumes that the user has declared the pointer variable P as a pointer to a volatile int as illustrated in line 1 of FIG. 1. A typical optimizing compiler would emit the sequence of instructions shown of FIG. 2. The first thing it would do is load a register R-1 with the value of P (instruction I1). Next it would initialize another register R-2 with the value 10 (instruction I2) and then do a store to the memory address location pointed to by P (instruction I3). Thus, R-1 contains the memory address that P is pointing to, and so using the contents of R-1 as a base register, the value contained in register R-2 is next stored into that memory location, which value of course happens to be 10. The store is illustrated with the mnemonic "STORE.O", including a special ".O" completer indicating to the hardware that this particular memory operation to store has to be treated as a strongly ordered memory operation. This is discussed in greater detail below. Meanwhile, it will be seen that instructions I1, I2 and I3 on FIG. 2 take care of compiling the statement on line 5 of FIG. 1, namely *P=10.

FIG. 2 next illustrates instructions I4 and I5 addressing the statement in line 6 of FIG. 1, namely Y=*P. A load is required for the right-hand side of the Y=*P expression. The value of P has previously been loaded into register R-1, and a third register R-3 can be loaded up with the value contained in the memory location pointed to by P (instruction I4). This value is immediately stored into the variable Y (instruction I5). It should again be noted that the load operation in instruction I4 has the special completer ".O" again, because, as with instruction I3, the load is from a volatile memory location and presumably in the absence of any other knowledge the compiler has to assume that those references have to be strongly ordered. In contrast, the store in instruction I5 does not have an order completer because Y is just an ordinary variable. Again, the significance of this structure is discussed in greater detail below. In summary, therefore, FIG. 2 would be a conservative five instruction sequence that a reasonable optimizing compiler might generate for the two statements given in lines 5 and 6 on FIG. 1. Note that the code sequence of FIG. 2 reflects the assumption, based on the ANSI standard, that P does not point to itself.

Figure 3:
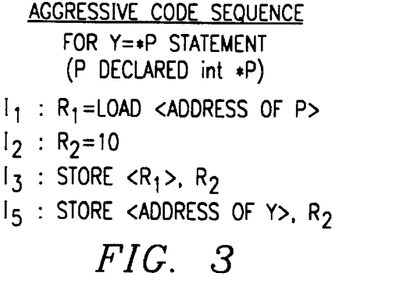
FIG. 3 is a sequence of instructions illustrating aggressive compilation of the function FOO shown in FIG. 1, momentarily ignoring the volatile type-qualifier.

Now with reference to FIG. 3, and in comparison to FIG. 2, an aggressive code sequence is illustrated for compiling lines 5 and 6 on FIG. 1. Let it first be assumed that in FIG. 1, instead of the pointer variable P being declared as volatile int*, it was declared to be just an ordinary pointer to an integer, that is without the volatile type-qualifier. In this case, a typical optimizing compiler can be a lot more aggressive in how lines 5 and 6 on FIG. 1 may be translated. With reference to FIG. 3, it would start by loading the value of P into register R-1, as before (instruction I1), and initializing R-2 with the value 10, as before (instruction I2). In instruction I3 on FIG. 3, though, the compiler can store the value in R-2 (i.e. 10) directly into the memory location pointed to by P (i.e. R-1). A special completer is not necessary on the store because P is no longer declared to be a pointer to a volatile integer location. The compiler may also omit instruction I4 on FIG. 2 because in the absence of a volatile declaration, it can make the assumption that having stored the value 10 to the location pointed to by P, it will get the same value 10 back from that location. So it might as well store the value 10 (which happens to be in the register R-2) directly into the global variable Y (instruction I5). The advantage in the aggressive code sequence of FIG. 3 over the conservative code sequence of FIG. 2 is that one instruction has been omitted, namely I4, and the ordered completer has been omitted from instruction I3.

As has been discussed above, there may be situations where an optimization such as is illustrated by FIG. 3 may be perfectly legal. In the current art, however, a compiler will nonetheless generally not perform such an optimization. The volatile type-qualifier may have been used because P is pointing to a volatile memory location such as a memory-mapped I/O location, and the compiler is obliged to interpret the volatile type-qualifier as a signal not to optimize.

As will now be described with reference to subsequent illustrations, the present invention supplies keywords which act as "hint modifiers" to the ANSI Standard volatile type-qualifier. These keywords "hint" to the compiler that despite the overall volatile declaration, certain optimization operations are legal according to the particular keyword(s) used.

Figure 4A:
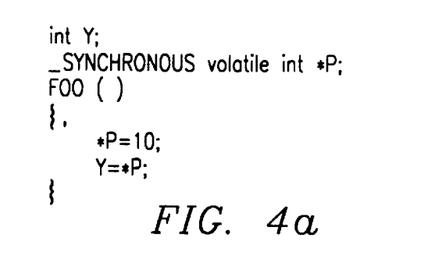
FIG. 4A is a segment of source code illustrating use of the keyword __SYNCHRONOUS.

FIG. 4A illustrates use of the keyword __SYNCHRONOUS. The reason for the underscore prefix is to adhere to the ANSI Standard convention, which says that any variable name that starts with an underscore followed by an upper-case letter is a reserved identifier. With reference to FIG. 4A, let it now be assumed that P points to a volatile memory location that is not a memory-mapped I/O location for an external device. Instead, let it be assumed that P points to a shared variable. This location is volatile because it is visible and accessible to other processes on the computer but its value does not trigger any external event or undergo any change in unexpected ways. Now, despite the overall volatile declaration of P, the compiler may make certain optimizations because it may expect values stored to that location to be the same as values subsequently loaded from that location possibly in any given function. In other words the values stored and loaded in that location are "sychronous."

Figure 4B:
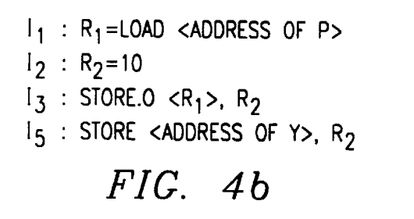
FIG. 4B is a sequence of instructions likely to be emitted by a compiler responsive to the source code of FIG. 4A.

With reference to FIG. 4A, therefore, a source code sequence is illustrated using the __SYNCHRONOUS keyword. It will be seen immediately that FIG. 4A reflects the same source code sequence as FIG. 1, except with the addition of the __SYNCHRONOUS keyword modifying the volatile declaration of P in line 2. According to the present invention, when the compiler sees that the __SYNCHRONOUS keyword is modifying the volatile declaration of P, it knows it can be aggressive in translating lines 5 and 6 into object code. In particular, the compiler emits an instruction sequence as shown in FIG. 4B. This sequence is exactly the same as in FIG. 3 (where an optimization caused instruction I4 in FIG. 2 to be omitted) except that instruction I3 on FIG. 4B must be an ordered store (using the ".O" completer) because it refers to a volatile memory location.

It will thus be seen that use of the __SYNCHRONOUS keyword has saved one instruction in the machine instruction sequence of FIG. 4B over FIG. 2 (without the keyword), potentially enabling the computer to execute this function faster.

Figure 5:
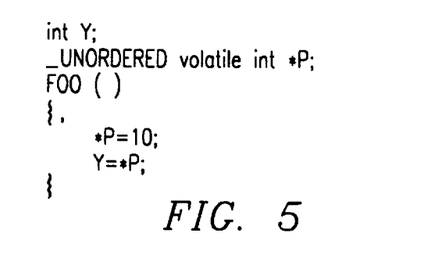
FIG. 5 is a segment of source code illustrating use of the keyword __UNORDERED.

Turning now to FIG. 5, the significance of the specially ordered completer ".O" is now discussed. It will be recalled that this was a feature made reference to in the above discussion of FIGS. 2, 3 and 4B, in that certain memory references corresponding to indirections through the pointer variable P had an ordered completer, the ".O" suffix. This suffix is an indication to the hardware that memory reference instructions having this suffix must be considered as strongly ordered, i.e. the hardware is required to execute those instructions in program order. This is in contrast to instructions containing memory references without the suffix, where on a weakly ordered system, the hardware would be at liberty to execute those instructions in any order so long as control and data dependencies are not violated.

The potential for compiler optimization of memory instructions by omitting the ".O" suffix is thus self-evident. Sometimes it is optimal to execute instructions making references to memory out of program order. For example, suppose some event such as a cache miss prevents a memory reference instruction from proceeding through the processor pipeline, while a subsequent memory reference hits in the cache. The computer may therefore process the later instruction before the earlier one, because the later instruction's data is already available, close to the processor. In such cases there is an advantage to letting the second instruction proceed ahead of the first instruction.

Use of the ordered completer ".O" on a memory reference instruction (because the associated source code makes reference at that time to a volatile memory location) will prevent the hardware from performing this optimization. This is necessary, for example, when the source code makes reference to a shared variable. There may be times when two processes A and B are running on a multiprocessor, communicating through a shared synchronization variable G guarding accesses to a large region of memory, say H, also commonly accessed by both processes. There is likely to be a protocol between these two processes A and B that says "before I access the region of memory H I will first check to see whether the variable G has the value 1 and if it doesn't then I will wait until it does, and then at that point I will replace it with the value 0. This will give me exclusive access to H, so that I do not compete with the other process at the same time for access to H. When I am done, I will change G back to 1 again so that the other process can access H." It will be appreciated that in an environment like this, it is very important to preserve the order in which the computer executes references to the synchronization variable G, or else process A might access H at times when process B was still expecting to have exclusive access. Again, the compiler has to be very conservative when it translates volatile references in terms of scheduling memory instructions with an ordered completer. The ordered completer may also cause the hardware to execute those ordered memory references at a possibly reduced speed, because it has to obey the program execution sequence for those instructions.

The foregoing notwithstanding, however, there may also be times when a compiler may safely execute memory references out of program order even though a volatile memory location is referenced. Supposing, for example, the user knows that the memory references in a function FOO are not going to be synchronization-dependent but nonetheless requires the volatile type-qualifier to be declared for some other reason. The present invention provides the _UNORDERED keyword as a modifier to the volatile type-qualifier to inform the compiler that it may omit the ordered completer on corresponding memory reference instructions.

Figure 6:
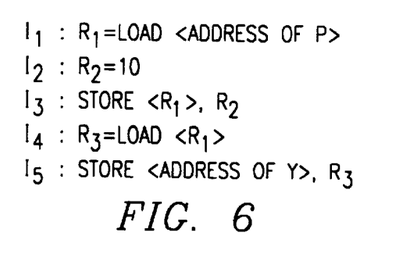
FIG. 6 is a sequence of instructions likely to be emitted by a compiler responsive to the source code of FIG. 5.

The _UNORDERED keyword therefore tells the compiler that when translating references to volatile memory locations that are so qualified it can omit the ".O" ordered completer. Use of the keyword is illustrated in FIG. 5. A corresponding sequence of instructions emitted by the compiler is illustrated on FIG. 6. It will be seen that FIGS. 5 and 6 are very analogous to FIGS. 1 and 2 except now, responsive to the _UNORDERED keyword in FIG. 5, the compiler has omitted the ordered completer on the store and load in instructions I3 and I4 on FIG. 6. The hardware is now free to optimize by executing those instructions, along with other related memory reference instructions, out of program order, provided control and data dependencies are not violated.

Figure 7:
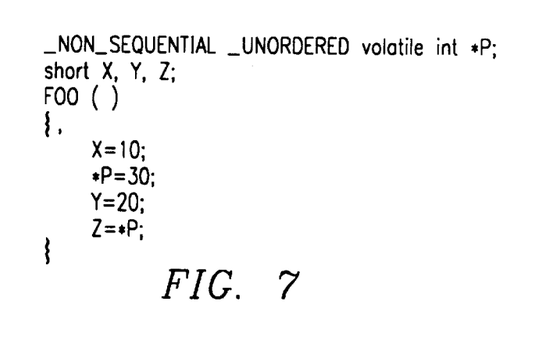
FIG. 7 is a segment of source code illustrating use of the keyword __NON__SEQUENTIAL in combination with the keyword __UNORDERED.

Turning now to FIG. 7, previous discussion regarding ordered completers has been focused on executing instructions in program order where those instructions contain references to volatile shared memory locations that implement synchronization protocols. However, there may be situation where memory references are declared volatile for reasons where the possibility of a synchronization variable guarding global memory is not germane. This may be when, for example, the volatile memory address is the location of a memory-mapped I/O device.

FIG. 7 introduces the _NON_SEQUENTIAL keyword to allow the compiler to optimize in such situations by reordering instructions. In other words, analogous to the _UNORDERED keyword described above with reference to FIGS. 5 and 6, the compiler may ignore the ordered completer ".O" as well as optimize these volatile memory references relative to other global non-volatile memory references. With reference to FIG. 7, P is declared on line 1 as pointer to volatile memory locations in the normal way, as modified by the keywords _UNORDERED and NON_SEQUENTIAL. Further, line 2 defines three global variables X, Y and Z with short integer data type characteristics. On line 3, function FOO is defined. Lines 5, 6, and 7 on FIG. 7 store the integer values 10, 30 and 20 respectively to the memory locations that correspond to X, *P and Y. On line 8, the contents of the memory location whose address is the current value of *P are read and the value is stored into memory location Z.

Figure 8:
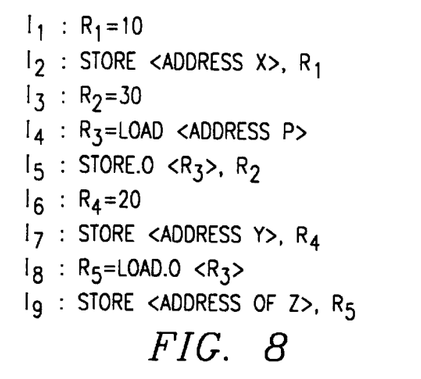
FIG. 8 is a sequence of instructions illustrating compilation of FIG. 7 momentarily ignoring the keywords __NON__SEQUENTIAL and __UNORDERED.

FIG. 8 illustrates the sequence of instructions corresponding to FIG. 7 that would be emitted by a compiler absent any modifying keywords of the present invention (i.e. P was merely declared to be a pointer to a volatile int). It will be seen in FIG. 8 that instructions I5 and I8, have the ordered completer and, furthermore, the relative order of those memory reference instructions I5 and I8 are preserved relative to the stores to global variables in instructions I2, I7 and I9. In other words, the compiler has preserved program order in generating these machine instructions.

Figure 9:
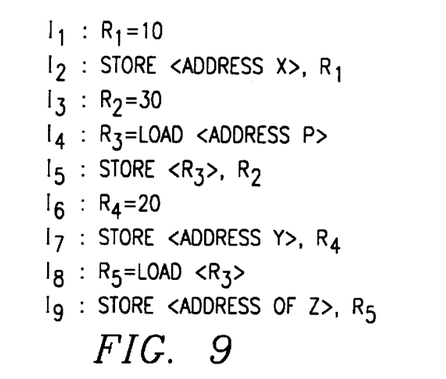
FIG. 9 is a sequence of instructions illustrating compilation of FIG. 7 with the effect of the keywords __NON__SEQUENTIAL and __UNORDERED enabled.
Figure 10:
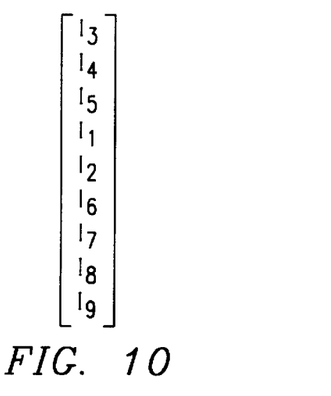
FIG. 10 illustrates an exemplary optimization of FIG. 9 through reordering the sequence of instructions.

Turning now to FIG. 9, and in comparison with FIG. 8, a possible code sequence is illustrated that might be generated, and legally could be generated by a compiler assuming that the _NON_SEQUENTIAL and the _UNORDERED keywords were specified in FIG. 7 for the volatile pointer P. It will be seen that FIG. 9 is very similar to FIG. 8 except that the ordered completer suffix ".O" on instructions I5 and I8 are removed. And now, with reference to FIG. 10, and responsive to the optimizations permitted by the _NON_SEQUENTIAL and _UNORDERED keywords in FIG. 7, it will be seen that the compiler has reordered instructions I4 and I5 relative to instructions I1, I2, and I-3. The compiler might do this, for example, to improve the computer's pipeline efficiency and to avoid stalls in the hardware as a program is executing. Note that the instruction sequence shown in FIG. 10 reflects the assumption, based on the ANSI Standard, that P does not point to X.

Figure 11:
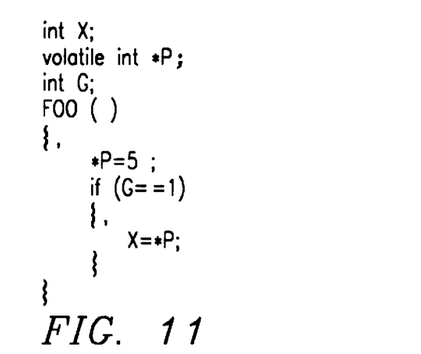
FIG. 11 is a segment of source code illustrating use of an IF statement with a volatile declaration.

A further application of the present invention is illustrated in FIG. 11. In line 2, a pointer variable P is again declared as a pointer to a volatile integer object, while lines 1 and 3 define two global variables X and G. Line 4 defines the function FOO again, but in FIG. 11 the function FOO contains an IF statement at line 7. That is, the function checks the value of the global variable G and if it happens to be 1, then whatever is in the volatile memory location pointed to by P is assigned to the variable X.

Figure 12:
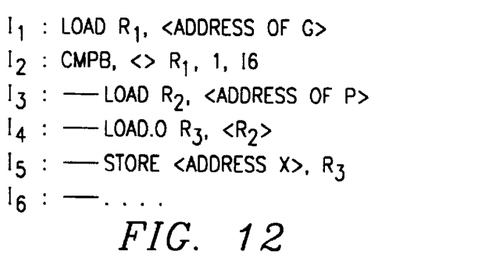
FIG. 12 is a sequence of instructions illustrating compilation of the IF statement in FIG. 11.

Referring now to FIG. 12, the code that might be generated by a compiler for the IF statement shown in FIG. 11 is illustrated in FIG. 12. Instruction I1 loads the value found in the memory location corresponding to the global variable G into register R-1. Instruction I2 is a compare and branch instruction that checks the value of R-1 against the constant 1 and if it fails, it causes a transfer of control to instruction I6 (the translation of the code after the IF statement). Alternatively, if the value of R-1 turns out to be the constant 1, then the next instructions in sequence are executed instead. In this case, instructions I3, I4 and I5 are executed (corresponding to the source code statement X=*P). This is accomplished first by instruction I3 loading the value in memory location P into register R-2 and then second by instruction I4 loading (with the ordered completer ".O") the memory location addressed by R-2 into register R-3, and then finally by instruction I5 storing the value of R-3 in memory location X.

Let it now be assumed that absent the volatile declaration in line 2 of FIG. 11, a compiler may wish to reorder instructions I3 and I4 of FIG. 12. Reordering them ahead of the compare and branch instruction at line I2 might be advantageous, because normally a load operation takes one, two and sometimes even three clock cycles. Having them back to back as in I3 and I4 will require the computer to wait up to three cycles, or however long a load takes, before it can perform I4. Furthermore, I4 may take up to another three cycles to complete, stalling the execution of the store in I5 for that time. So there is something to be gained by moving instructions I3 and I4 ahead of I2 because while these load operations are taking place, the computer can start performing line I2's compare and branch in parallel with the load operations, thereby executing the whole sequence in fewer cycles. Note that it is safe to reorder instructions I3 and I4 ahead of instruction I2 because the pointer variable P has already been de-referenced before the IF statement.

Unfortunately, the compiler is not at liberty to make this optimization in FIG. 12 because the load corresponding to I4 on FIG. 12 happens to be a volatile load, which could have unforeseeable side effects. Consider what would happen if this volatile memory location happened to be a memory mapped I/O location used to communicate with an external device. As described above, depending on the device's protocols, the compiler is not free to expect that a value loaded from this location will not trigger any external events. By moving I4's load ahead of the compare and branch instruction at I2, the compiler runs the risk of triggering a side effect even when the compare and branch test fails. And so moving I4 ahead of I2 is not safe in these circumstances.

On the other hand, if the user knew that this volatile memory reference was not a memory mapped I/O location but it is declared volatile for other reasons (it contains a shared synchronization variable, perhaps), then it might be advantageous to enable the compiler to optimize by moving I4 ahead of I2 and speed up the program.

Figure 13:
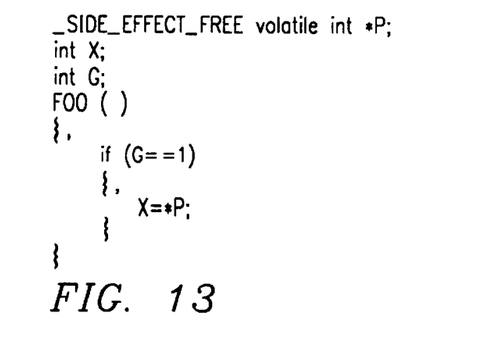
FIG. 13 is a segment of source code similar to FIG. 11 illustrating use of the keyword __SIDE__EFFECT__FREE.
Figure 14:
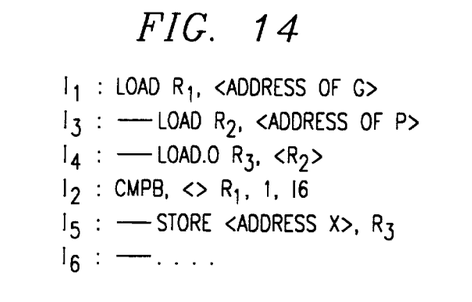
FIG. 14 is a sequence of instructions illustrating compilation of the IF statement in FIG. 13.

FIG. 13 introduces another keyword, __SIDE__EFFECT__ FREE, which modifies the volatile type-qualifier to permit the compiler to make this optimization in selected circumstances. FIG. 13 is effectively the same segment of source code as illustrated in FIG. 11, except the __SIDE__ EFFECT__FREE keyword is shown modifying the volatile declaration of P. In the presence of the keyword, the compiler may make cross block code motions in choosing a sequence of execution because the user knows that although volatile memory locations are referenced, they do not involve memory locations such as memory mapped I/O locations where references thereto can trigger side effects. The result may be an optimized code sequence as shown in FIG. 14 where the two loads corresponding to I3 and I4 in FIG. 12 have been scheduled or reordered ahead of the compare and branch instruction I2. So again, the advantage of this is that load instructions, particularly the load corresponding to I4, can now execute in parallel with a compare branch shown as I2, thereby optimizing processing time.

Figure 15:
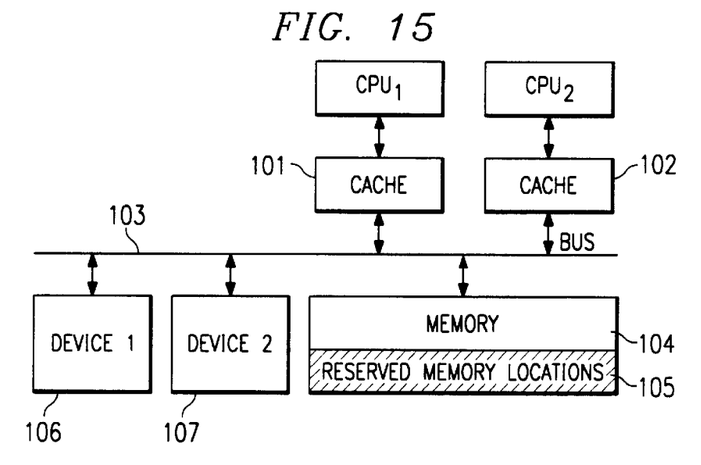
FIG. 15 illustrates exemplary architecture of a multiprocessor on which the present invention may be enabled.

FIG. 15 illustrates architecture in a generic computer system in which the advantages of the present invention can be further appreciated. FIG. 15 illustrates a multiprocessor computer system having two CPUs labeled $CPU_1$ and $CPU_2$. Each has its own cache 101 and 102 respectively. Bus 103 enables $CPU_1$ and $CPU_2$ to communicate with memory 104, which also includes reserved memory locations 105. Device 1 and Device 2 (labeled 106 and 107 respectively) can also communicate with memory 104 via bus 103. In a system like this, bus 103 would typically be a shared bus.

Whenever $CPU_1$ and $CPU_2$ perform memory operations like loads and stores, they first access caches 101 and 102, which are private, very fast specialized memory components used to house frequently referenced memory locations. So typically when a CPU executes a memory reference to a location for the very first time, it checks the cache first to see if that memory location has already been fetched into the cache. If it has not, the cache in turn cannot service the CPU request, and so the CPU must make a request to main memory 104 located on the other side of bus 103. So the CPU sends out a memory transaction request over bus 103.

Responsive to the request, memory 104 goes and fetches the location that is required by the cache. Typically the amount of data that gets transferred back is a fixed unit of memory data, perhaps 32 bytes, that includes the cache's request. So for example, if the cache is seeking to load a value that comprises four bytes starting from memory address 500, the memory may send back the data in addresses 500 through 531.

The reason for sending back more memory values than what the actual CPU needs is so that in case the CPU then requests the next adjacent memory location, the value thereof is already in the cache. This enhances processing speed dramatically. A cache miss and main memory request generally takes tens of clock cycles on modern microprocessors, while a cache hit may only take two or three clock cycles.

With further reference to FIG. 15, devices 106 and 107 are external peripherals, such as an I/O device or a graphics card. Reserved memory locations 105 (normally a contiguous sequence of memory addresses) are typically dedicated to serving such external devices. Further, a convention controls access to reserved memory locations 105 in that there is no physical allocation of memory corresponding to those reserved addresses, but rather, those addresses are intercepted by the device. When requests relating to those addresses are seen on bus 103, they are ignored by memory 104 and instead are interpreted and acted upon by the devices that happen to be associated with those addresses. Generally, each device will have its own unique set of addresses so that there is no competition for reserved memory locations 105 amongst different devices.

In combination with the present invention, the volatile type declaration is very useful within this arrangement. As noted above, references to an I/O mapped memory location require the compiler to be conservative in performing optimizations, and so the user ordains this by using a volatile declaration. Similarly, as noted above, the compiler must treat references to shared variables very conservatively, and so the user must again ordain this by making a volatile declaration. But suppose the user makes the volatile declaration because of references to a shared variable known to be stored in memory 104, but not in reserved memory locations 105. Clearly, certain optimizations (such as reordering of instructions) might be legal, since no references are to be made to reserved memory locations 105 where external peripherals can respond to loads or stores to those locations. In this case, according to the present invention, the user can modify the volatile declaration with a keyword such as __SIDE__EFFECT__FREE, which, as described above, enables the compiler to reorder instructions relative to branches without compromising processing integrity.

Referring back to FIG. 7, line 1 also illustrates how these new keywords can be used in combination. It will be appreciated that each of the keywords, and the "hints" that they represent, are providing a relaxation that is orthogonal to other aspects of the volatile attribute. Thus, specifying some or all of them in any combination is permissible.

It will be further appreciated that the present invention is not limited to the four exemplary keywords illustrated herein. Consistent with the scope of the present invention, many keywords may be defined to modify a volatile declaration in different ways to permit the compiler to make selected optimizations.

Figure 16:
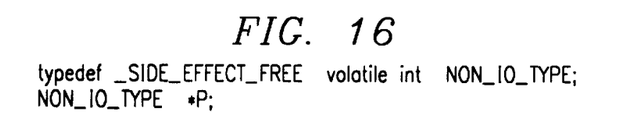
FIG. 16 illustrates use of a typedef declaration to create mnemonic type names including keywords of the present invention.

Under the ANSI Standard users may also use a typedef declaration to create more mnemonic names for individual data types used to declare variables referenced and accessed by their programs. FIG. 16 illustrates use of the typedef declaration as applied to the present invention. In FIG. 16, the user is defining on line 1 a new data type called NON__I/O__TYPE. The typedef declaration says that the NON__I/O__TYPE data type is defined to be a __SIDE__ EFFECT__FREE volatile integer data type. So now, as shown on line 2 of FIG. 16, the user may write NON__I/O__TYPE instead of __SIDE__EFFECT__FREE volatile int every time she wants to declare a volatile pointer to a variable that is not pointing to a memory mapped I/O location. The economies of this feature are self-evident.

Figure 17:
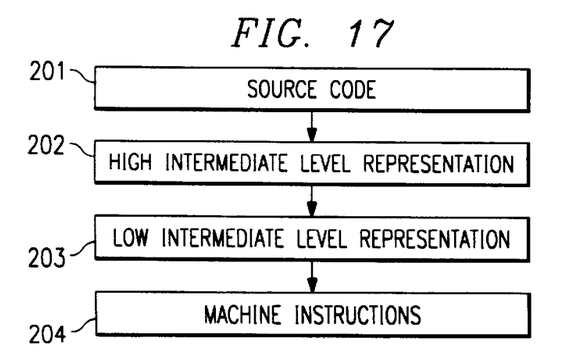
FIG. 17 illustrates the sequence followed by a typical compiler when translating source code into machine instructions.

FIG. 17 is a representation of the internals of a compiler at a very high level, starting from source code 201 as illustrated above in FIGS. 1, 4A, 5, 7, 11 and 13. The compiler checks the code at this first level 201 for syntax and semantics correctness. Next, the compiler then translates the source level expression of the program 201 into a high intermediate level representation 202, and then into a low intermediate level representation 203. High intermediate level representation 202 tends to be an abstract program representation, while low intermediate level representation 203 is very close to machine instructions 204. A low-level optimizer typically optimizes code by transforming it to generate a more efficient sequence of machine instructions to perform a given task. More specifically, a compiler generally seeks to reorder instructions to make pipelines execute more efficiently or just reduce the total number of instructions, so that, while preserving the integrity of the program logic, the program takes fewer cycles to execute. Most optimizations governed by the keywords described herein and according to the present invention are made at low intermediate level 203.

With further reference to FIG. 15, it will also be understood that the present invention may be embodied on software executable on a general purpose computer including a processing unit accessing a computer-readable storage medium, a memory (including a cache memory and a main memory), and a plurality of I/O devices.

Although the present invention and its advantages have been described in detail, it should be understood that various changes, substitutions and alterations can be made herein without departing from the spirit and scope of the invention as defined by the appended claims.

What is claimed is:

1. A computer program compiler disposed to accept code expressed at a first level, wherein said first level is a source code language, said source code language supporting datatype extensions to declare objects as volatile, and to transform sequences of said accepted code into a second level thereof according to a regime of rules, wherein the compiler invokes selected ones of said rules responsive to identification of corresponding selected words in said accepted code, said corresponding selected words including optimization restriction words, said selected ones of said rules including corresponding optimization restriction rules, said optimization restriction rules operable, responsive to identification of corresponding optimization restriction words, to restrict selected optimizations by the compiler of code at said second level thereof, the compiler comprising:

at least one keyword operable to be associated with ones of said optimization restriction words; and each keyword further operable, responsive to identification thereof by the compiler, to relax selected optimization restriction rules corresponding to the optimization restriction words with which said keyword is associated.

2. The compiler of claim 1, in which the second level is a machine language.

3. The compiler of claim 1, in which said source code language is selected from the group consisting of:

(a) C; and (b) C++.

4. The compiler of claim 1, in which the at least one keyword is selected from the group consisting of:

(a) SYNCHRONOUS;

(b) __UNORDERED;

(c) __NON-SEQUENTIAL; and (d) __SIDE__EFFECT__FREE.

5. The compiler of claim 1, in which the at least one keyword is operable to relax synchronicity restrictions on volatile memory accesses.

6. The compiler of claim 1, in which the at least one keyword is operable to relax restrictions on machine instruction execution sequence ordained by use of ordered completers in said accepted code.

7. The compiler of claim 1, in which the at least one keyword is operable to relax restrictions on machine instruction execution sequence based on the relative sequence of volatile memory accesses and selected non-volatile memory accesses.

8. The compiler of claim 1, in which the at least one keyword is operable to relax restrictions on machine instruction execution sequence ordained by the use of branching logic in said accepted code.

9. The compiler of claim 1, in which the first level is a source code language and the second level is machine language, and wherein the compiler performs optimizations, where authorized, at an intermediate level of expression between said first and second levels.

10. The compiler of claim 1, in which the at least one keyword comprises at least two keywords disposed to be combined in association with ones of said optimization restriction words, and wherein said keyword combination is operable to relax a corresponding combination of optimization restriction rules.

11. The compiler of claim 1, further comprising at least one mnemonic name, each mnemonic name identifiable by the compiler as a shorthand for a predefined combination of keywords in association with optimization restriction words.

12. A computer program compiler disposed to accept code expressed at a first level and to transform sequences of said accepted code into a second level thereof according to a regime of rules, wherein the compiler invokes selected ones of said rules responsive to identification of corresponding selected words in said accepted code, said corresponding selected words including optimization restriction words, said selected ones of said rules including corresponding optimization restriction rules, said optimization restriction rules operable, responsive to identification of corresponding optimization restriction words, to restrict selected optimizations by the compiler of code at said second level thereof, the compiler comprising:

at least one keyword operable to be associated with ones of said optimization restriction words;

each keyword further operable, responsive to identification thereof by the compiler, to relax selected optimization restriction rules corresponding to the optimization restriction words with which said keyword is associated; and each keyword further operable to relax synchronicity restrictions on volatile memory access.

13. A computer program compiler disposed to accept code expressed at a first level and to transform sequences of said accepted code into a second level thereof according to a regime of rules, wherein the compiler invokes selected ones of said rules responsive to identification of corresponding selected words in said accepted code, said corresponding selected words including optimization restriction words, said selected ones of said rules including corresponding optimization restriction rules, said optimization restriction rules operable, responsive to identification of corresponding optimization restriction words, to restrict selected optimizations by the compiler of code at said second level thereof, the compiler comprising:

at least one keyword operable to be associated with ones of said optimization restriction words;

each keyword further operable, responsive to identification thereof by the compiler, to relax selected optimization restriction rules corresponding to the optimization restriction words with which said keyword is associated; and each keyword further operable to relax restrictions on machine instruction execution sequence based on the relative sequence of volatile memory accesses and selected non-volatile memory accesses.

* * * * *